(12) United States Patent
Noh et al.

(10) Patent No.: US 10,248,220 B2
(45) Date of Patent: Apr. 2, 2019

(54) METHOD AND APPARATUS FOR CHINESE CHARACTER INPUT

(71) Applicant: BENEDEA INC., Seoul (KR)

(72) Inventors: Hyun-Kyung Noh, Seoul (KR); Seung-Kwon Noh, Seoul (KR)

(73) Assignee: BENEDEA INC., Seoul (KR)

( * ) Notice: Subject to any disclaimer, the term of this patent is extended or adjusted under 35 U.S.C. 154(b) by 0 days.

(21) Appl. No.: 15/529,162

(22) PCT Filed: Nov. 10, 2015

(86) PCT No.: PCT/KR2015/012052
§ 371 (c)(1),
(2) Date: May 24, 2017

(87) PCT Pub. No.: WO2016/085156
PCT Pub. Date: Jun. 2, 2016

(65) Prior Publication Data
US 2017/0344126 A1    Nov. 30, 2017

(30) Foreign Application Priority Data

Nov. 24, 2014 (KR) .................. 10-2014-0164792
Apr. 9, 2015 (KR) .................. 10-2015-0050403

(51) Int. Cl.
*G06F 3/01* (2006.01)
*G06F 3/023* (2006.01)
*G06F 3/0488* (2013.01)

(52) U.S. Cl.
CPC ............ *G06F 3/018* (2013.01); *G06F 3/0236* (2013.01); *G06F 3/04886* (2013.01)

(58) Field of Classification Search
CPC ...... G06F 3/0233; G06F 3/0231; G06F 3/018; G06F 3/0236
See application file for complete search history.

(56) References Cited

U.S. PATENT DOCUMENTS 4,365,235 A * 12/1982 Greanias .................. G06K 9/46
382/189
5,831,636 A * 11/1998 Merchant ................ G06F 3/018
345/467

(Continued)

FOREIGN PATENT DOCUMENTS

JP        S54-30730        3/1979
JP        62-003369 A      1/1987

(Continued)

OTHER PUBLICATIONS

European Search Report dated Oct. 13, 2017 in connection with the counterpart European Patent Application No. 15864161.3, citing the above reference(s).

(Continued)

*Primary Examiner* — Md Saiful A Siddiqui
(74) *Attorney, Agent, or Firm* — Hauptman Ham, LLP

(57) ABSTRACT

A character input method includes receiving an input of at least one base shape and a base shape input signal from a user, generating a root shape by combining the at least one base shape input before the input of the base shape input signal, according to the input of the base shape input signal, receiving an input of an input complete signal from the user, and generating a character by combining the at least one root shape generated before the input of the input complete signal, according to an input of the input complete signal.

12 Claims, 9 Drawing Sheets

(56) References Cited

U.S. PATENT DOCUMENTS

| | | | | |
|---|---|---|---|---|
| 6,094,506 A | * | 7/2000 | Hullender | G06K 9/6256 |
| | | | | 382/185 |
| 2010/0302164 A1 | | 12/2010 | Pienimaa et al. | |
| 2012/0139859 A1 | * | 6/2012 | Ohira | G06F 3/018 |
| | | | | 345/173 |

FOREIGN PATENT DOCUMENTS

| | | |
|---|---|---|
| JP | H04-124715 A | 4/1992 |
| JP | 06-034138 B2 | 5/1994 |
| JP | 07-191979 A | 7/1995 |
| JP | 2002-535768 A | 10/2002 |
| JP | 2010-525482 A | 7/2010 |
| KR | 10-2005-0076146 A | 7/2005 |
| KR | 10-2008-0081074 A | 9/2008 |
| WO | 2009/074278 A1 | 6/2009 |

OTHER PUBLICATIONS

International Search Report for PCT/KR2015/012052 dated Mar. 31, 2016 citing the above reference(s).

Japanese Office Action dated May 25, 2018 in connection with the counterpart Japanese Patent Application No. 2017-528844, citing the above reference(s).

* cited by examiner

METHOD AND APPARATUS FOR CHINESE CHARACTER INPUT

CROSS REFERENCE TO RELATED APPLICATION

This present application is a national stage filing under 35 U.S.C § 371 of PCT application number PCT/KR2015/012052 filed on Nov. 10, 2015 which is based upon and claims the benefit of priority to Korean Patent Application No. 10-2014-0164792 filed on Nov. 24, 2014 and Korean Patent Application No. 10-2015-0050403 filed on Apr. 9, 2015 in the Korean Intellectual Property Office. The disclosures of the above-listed applications are hereby incorporated by reference herein in their entirety.

TECHNICAL FIELD

The present disclosure relates to a method and apparatus for inputting a Chinese character.

BACKGROUND ART

Due to recent developments in China, a demand for learning Chinese characters and the number of persons using the Chinese characters have been sharply increased. Unlike the Korean characters or the English characters that are relatively simple character systems having a relatively small number of characters, the Chinese characters, which are ideographic characters including hieroglyphic characters, include tens of thousands of irregular characters. Accordingly, since it is unable to input the Chinese characters, as they are, by using a keyboard having a limited number of keys in electronic apparatuses such as computers or mobile phones, there are various difficulties in applying the Chinese characters to the electronic apparatus.

In general, as a conventional method of inputting the Chinese characters, a "Hanyu Pinyin" input method and a "Five Strokes" input method have been most widely used.

First, according to the Hanyu Pinyin input method, characters of the same pronunciation are listed as candidates and a desired character is selected to be input. In this method, however, even when one knows a Chinese character to input, the Chinese character should be input by using Roman characters. Furthermore, since there are so many Chinese characters having the same pronunciation, it is very inconvenient to select a desired character from a group of Chinese characters having the same pronunciation every time a Chinese character is to be input. Furthermore, if one does not know accurate pronunciation, an error may occur in a process of selecting and inputting a correct Chinese character.

Second, according to the Five Strokes input method, a Chinese character may be input as a combination by using strokes and radicals of Chinese characters. In order to use the Five Strokes input method, one should memorize symbols and keys of the Five Strokes and know the order of writing a Chinese character and a method of inputting the Five Strokes. When a Chinese character is input by using the Five Strokes, the Chinese character may be input by typing mainly four symbols or by typing one or three symbols for frequently used words, according to cases. Accordingly, when one is accustomed to the Five Stroke input method, the input method may enable a relatively fast input of a Chinese character, compared to the Hanyu Pinyin input method. However, it is a drawback that it is difficult to learn the Five Strokes input method because some characters are difficult to be intuitively input without a Five Strokes dictionary. In other words, the Five Strokes input method requires a long-time training method to learn the input method.

Accordingly, there is a demand for a new Chinese character input method to directly input the Chinese characters, unlike the Hanyu Pinyin input method, and to intuitively and easily input the Chinese characters, unlike the Five Strokes input method.

DISCLOSURE

Technical Problem

It is an object of the present disclosure to enable fast, easy, and direct input of the Chinese characters through intuitive input of a base shape without high learning curve, unlike the conventional Chinese character input methods.

It is another object of the present disclosure to not only enable practicing and learning of the Chinese characters through the base shape input, but also enable a beginner to easily input the Chinese characters, by a method of inputting at least one base shape forming a root shape that is a radical of a Chinese character.

The technical problems of the present disclosure are not limited to the above-mentioned technical objects, and other technical objects which are not mentioned can be clearly understood by those skilled in the art from the following description.

Technical Solution

In accordance with one aspect of the present disclosure, a character input method includes receiving an input of at least one base shape and a base shape input signal from a user, generating a root shape by combining the at least one base shape input before the input of the base shape input signal, according to the input of the base shape input signal, receiving an input of an input complete signal from the user, and generating a character by combining the at least one root shape generated before the input of the input complete signal, according to an input of the input complete signal.

In accordance with another aspect of the present disclosure, a character input apparatus includes an input portion configured to receive inputs of at least one base shape, a base shape input signal, and an input complete signal from a user, a root shape generation portion configured to generate a root shape by combining the at least one base shape input before the input of the base shape input signal, according to the input of the base shape input signal, and a character processing portion configured to generate a character by combining at least one root shape generated before the input of the input complete signal, according to the input of the input complete signal.

Advantageous Effects

According to the present disclosure, the Chinese characters may be quickly, easily, and directly input through intuitive base shape input without high learning curve, unlike the conventional Chinese character input methods.

Furthermore, according to the present disclosure, the method of inputting at least one base shape forming a root shape that is a radical of a Chinese character has advantages in that not only the Chinese characters may be learned through the base shape input, but also a beginner may easily input the Chinese characters.

BEST MODE

Figure 1:
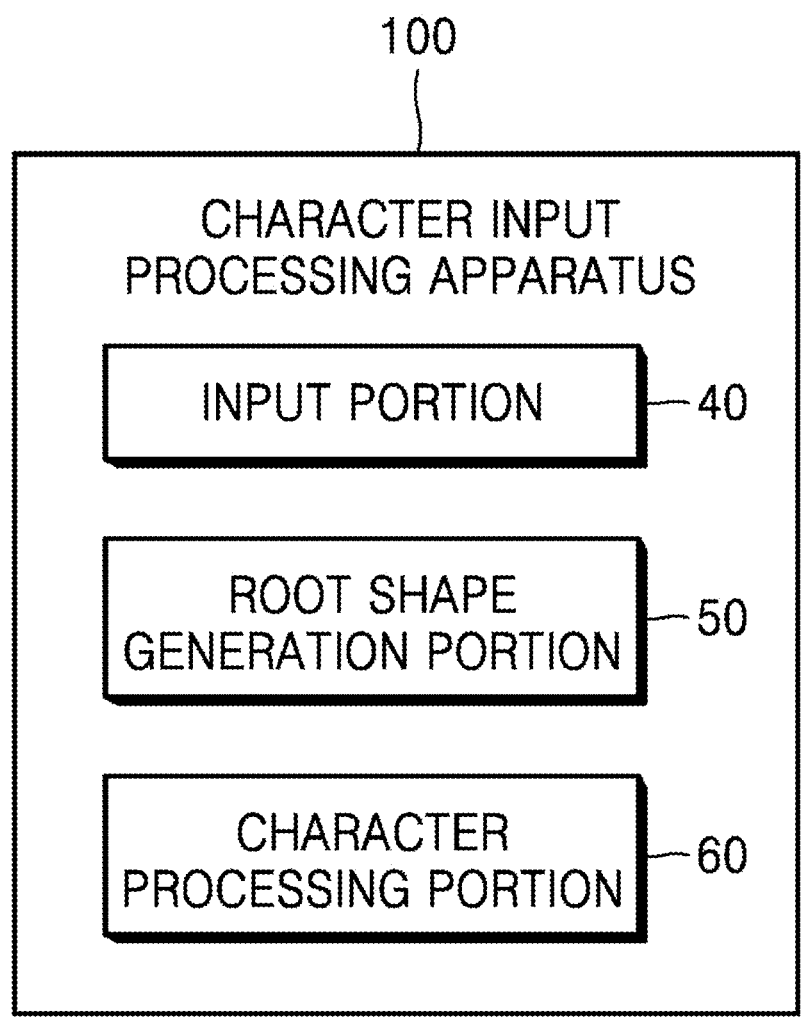
FIG. 1 is a block diagram of a configuration of a character input apparatus according to an embodiment of the present disclosure.

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well-known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Unless defined otherwise, all terms used herein (including technical or scientific terms) have the same meanings as those generally understood by those of ordinary skill in the art to which the present inventive concept may pertain. The terms as those defined in generally used dictionaries are construed to have meanings matching that in the context of related technology and, unless clearly defined otherwise, are not construed to be ideally or excessively formal.

Terms used in the present specification are used for explaining a specific embodiment, not for limiting the present inventive concept. Thus, an expression used in a singular form in the present specification also includes the expression in its plural form unless clearly specified otherwise in context. It will be further understood that the terms "comprises" and/or "comprising" used herein specify the presence of stated features or components, but do not preclude the presence or addition of one or more other features or components.

Hereinafter, an electrical stimulation device according to embodiments of the present disclosure is described with reference to the accompanying drawings.

FIG. 1 is a block diagram of a configuration of a character input apparatus 100 according to an embodiment of the present disclosure.

Referring to FIG. 1, the character input apparatus 100 according to an embodiment of the present disclosure may include an input portion 40, a root shape generation portion 50, and a character processing portion 60, to generate a character in response to a base shape input by a user. In another embodiment, the character input apparatus 100 may display a base shape, a root shape, or a character in real time through a display portion in response to a base shape input by a user. In another embodiment, the character input apparatus 100 may further include a display portion.

In the present embodiment, the base shape may include a plurality of base shapes for characters including the traditional Chinese characters and the simplified Chinese characters, as shown in Table 1 below. The traditional Chinese characters may signify characters used in Korea or Japan, and the simplified Chinese characters may signify characters used in China.

TABLE 1

| | |
|---|---|
| 1 | Z |
| 2 | Z |
| 3 | ⟨ |
| 4 | ⎯ |
| 5 | ㅗ |
| 6 | ㅡ |
| 7 | ß |
| 8 | / |
| 9 | ㅣ |
| 10 | l |
| 11 | ノ |
| 12 | ㄏ |
| 13 | ㄱ |
| 14 | ㄴ |
| 15 | ㄴ |
| 16 | ㄴ |
| 17 | ㄱ |
| 18 | ㄱ |
| 19 | ⁊ |
| 20 | ㄱ |
| 21 | ㄱ |
| 22 | ㄴ |
| 23 | ㄴ |
| 24 | ㄱ |
| 25 | ㄱ |
| 26 | l |
| 27 | l |
| 28 | ) |
| 29 | * |
| 30 | ㄴ |
| 31 | ㄱ |
| 32 | ㄱ |
| 33 | ⎯ |
| 34 | \ |
| 35 | ㄴ |
| 36 | |

In other words, the base shapes set forth in Table 1 may have a shape of a minimum unit forming the simplified Chinese character and the traditional Chinese character and may be arranged in a form of keyboard buttons in the input portion 40.

As such, the input portion 40 may receive a user input of at least one of the base shapes among the base shapes of the Table 1. In detail, as a user inputs a key button corresponding to the base shape included in the input portion 40, the input portion 40 may receive an input of the base shape of Table 1.

Figure 2:
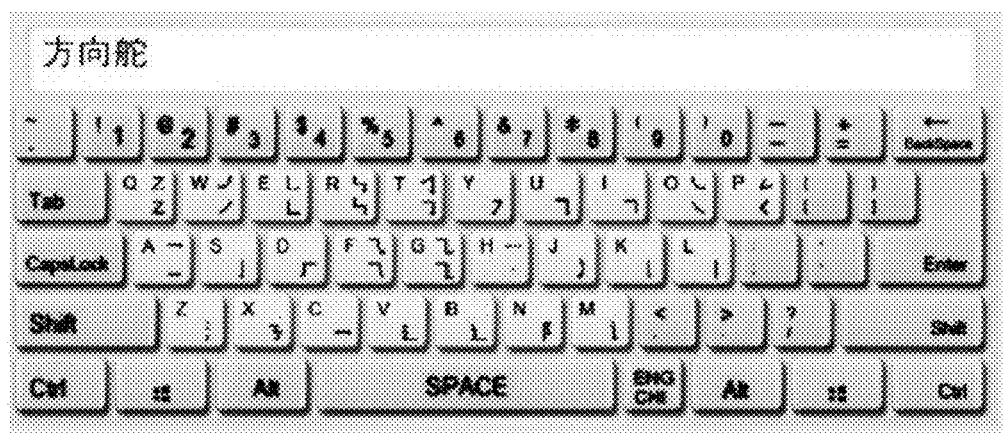
FIGS. 2A, B and C illustrates an embodiment of an input portion.
Figure 2:
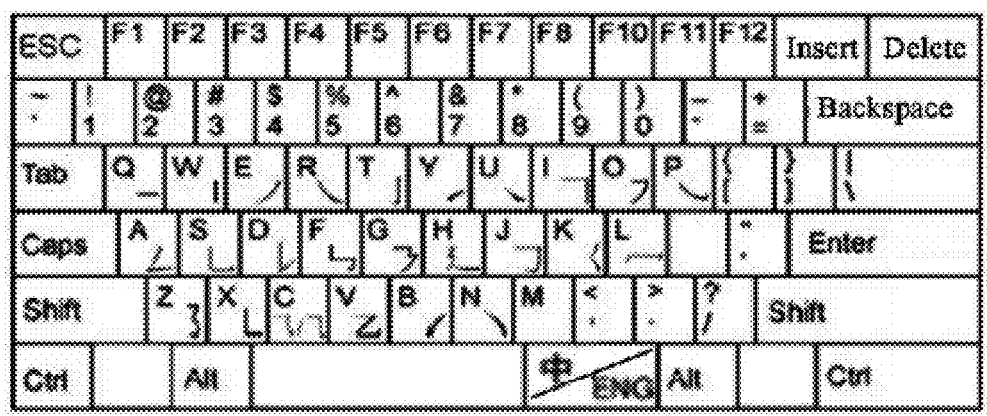
Figure 2:
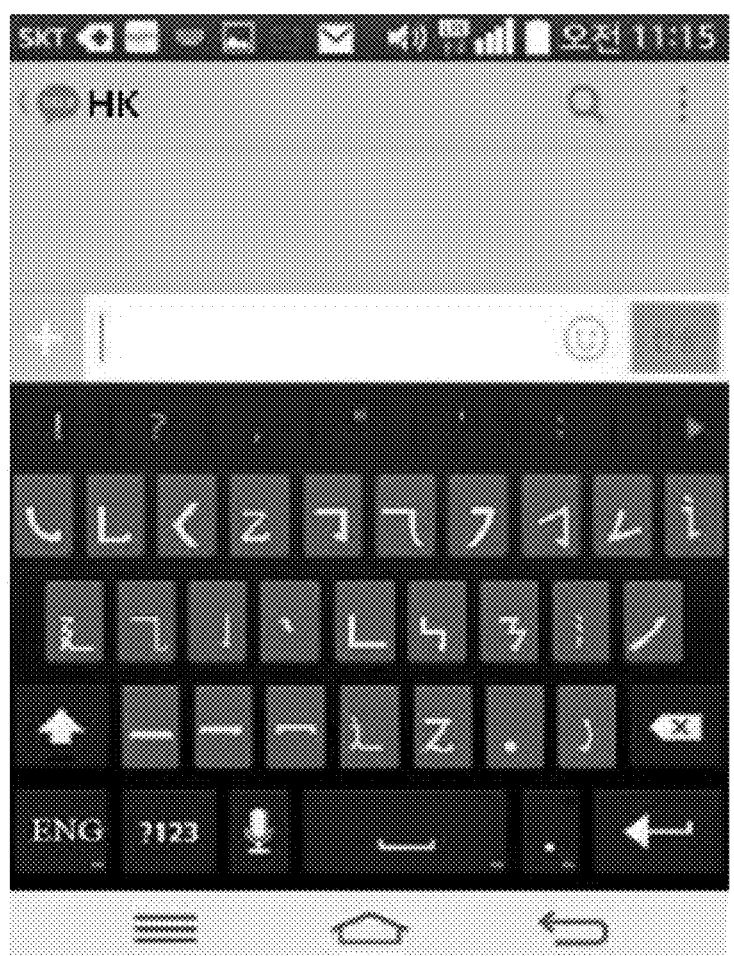

FIG. 2 illustrates an embodiment of the input portion 40.

Referring to FIG. 2, the input portion 40 may be a computer keyboard or a keypad shown in FIG. 2 (*a*) to receive a user input of a base shape. For example, the input portion 40 may previously set a "W" key button to a key corresponding to the 8$^{th}$ base shape of Table 1 from the user, an "0" key button to a key corresponding to the 34$^{th}$ base shape, and a "T" key button to a key corresponding to the 25$^{th}$ base shape. In other words, the respective key buttons corresponding to a plurality of base shapes may be previously set with images of the base shapes. The input portion 40 may previously set positions of key buttons corresponding to the previously set base shapes, as illustrated in FIG. 2 (*a*), when the form of a character is according to the traditional Chinese characters. Accordingly, the input portion 40 may provide an intuitive base shape to the user.

According to another embodiment, the input portion 40, as illustrated in FIG. 2 (*b*), may previously set positions of key buttons corresponding to the previously set base shapes when the form of a character is according to the simplified Chinese characters. According to another embodiment, the input portion 40 may be a touch pad for inputting the base shape through a display device, as illustrated in FIG. 2 (*c*). According to another embodiment, the input portion 40 may be a voice input device (not shown) for inputting the base shape through user's voice.

Furthermore, the input portion 40 may receive an input of a base shape input signal after receiving the input of at least one of the base shapes from the user. In detail, after inputting a base shape to the input portion 40, the user may input a first specific button such as any one of a space bar or a function button, except a key button corresponding to the base shape.

According to another embodiment, after receiving the input of at least one of the base shapes from the user, the input portion 40 may automatically generate a base shape input signal referring to the preciously stored combination information. The combination information may be a data table of root shapes generated according to the input of the previously stored base shape from a manufacture or the user. The root shape is a combination of two or more base shapes or a combination of one base shape, which may be a radical of a Chinese character that the user desires to input. For example, the root shape may have a combination similar to the radicals of Chinese characters. Furthermore, a character itself that the user desires to input may be a root shape according to characters. In other words, the input portion 40 may generate the base shape input signal referring to the previously stored combination information even when no base shape input signal is input from the user.

According to another embodiment, when a certain time passes after receiving at least one of the base shapes from the user, the input portion 40 may automatically generate a base shape input signal referring to the previously stored combination information. As described above, the input portion 40 may not only receive an input of a first specific button corresponding to the base shape input signal, but also automatically generate a base shape input signal, in FIGS. 3 to 5, to clearly describe the input of a base shape input signal, the base shape input signal is illustrated as an input of a first specific button such as a space key.

Next, the root shape generation portion 50 may generate a root shape by combining at least one of the base shapes input before the input of the base shape input signal corresponding to the input of a first specific button of the input portion 40 or the base shape input signal generated by the input portion 40.

A process of generating a root shape by the root shape generation portion 50 is described below with reference to FIG. 3, assuming a process of receiving an input of a character "分", which is one of the traditional Chinese characters, from a user.

Figure 3:
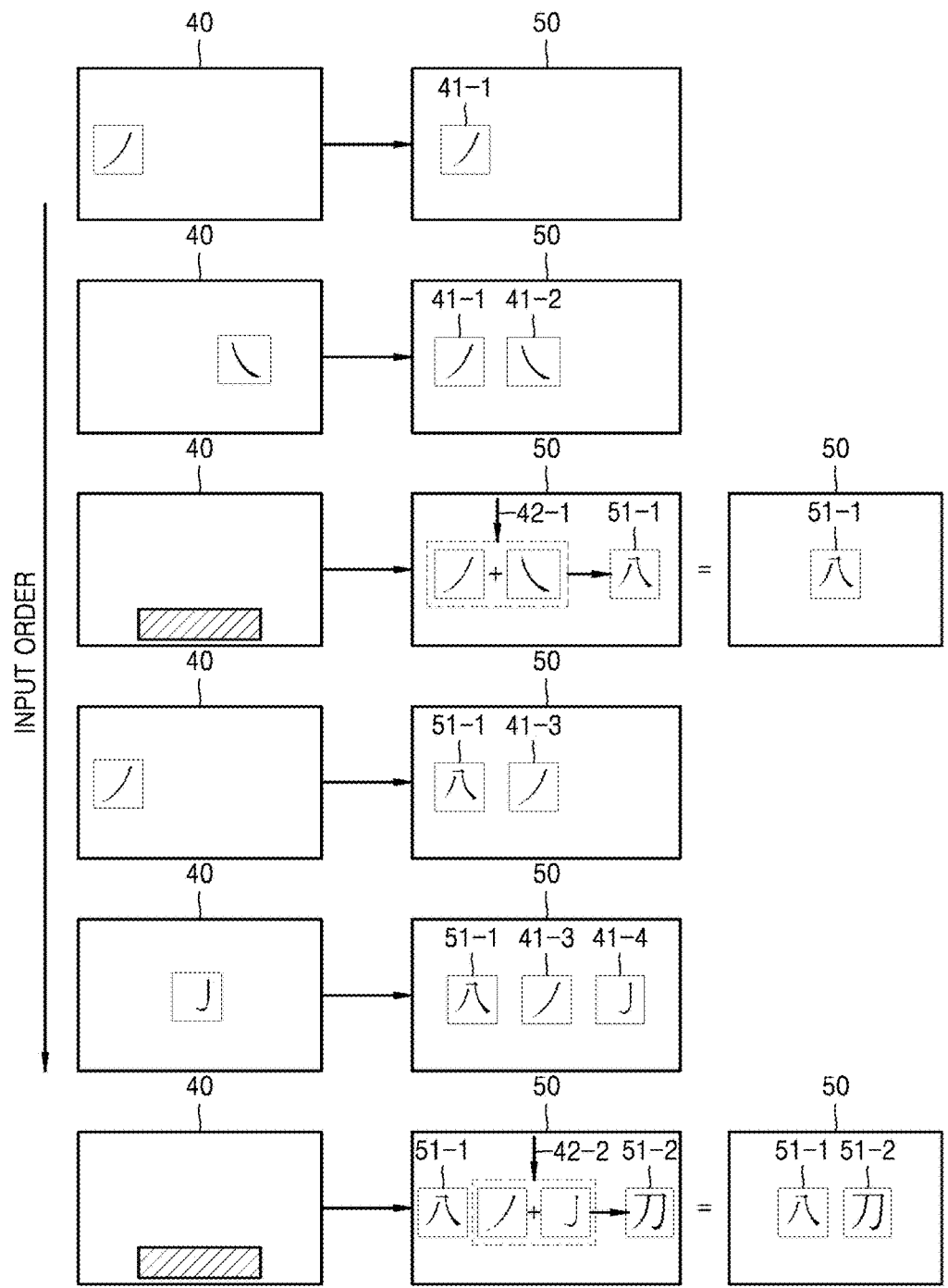
FIG. 3 illustrates an embodiment of an operation of a root shape generation portion.

FIG. 3 illustrates an embodiment of an operation of the root shape generation portion 50.

Referring to FIG. 3, a user may input the Chinese character "分" as follows.

First input—a keyboard button input corresponding to the 8$^{th}$ base shape of Table 1

Second input—a keyboard button input corresponding to the 34$^{th}$ base shape of Table 1

Third input—a first specific button input such as a space bar or a base shape input signal automatically generated by the input portion 40

Fourth input—a keyboard button input corresponding to the 8$^{th}$ base shape of Table 1

Fifth input—a keyboard button input corresponding to the 25$^{th}$ base shape of Table 1

Sixth input—the first specific button input such as a space bar or a base shape input signal automatically generated by the input portion 40

In other words, the input portion 40 may receive inputs in an order of a first base shape 41-1, a second base shape 41-2, a first base shape input signal 42-1, a third base shape 41-3, a fourth base shape 41-4, and a second base shape input signal 42-2, from a user, through the first input to the sixth input. According to another embodiment, the input portion 40 may generate the first base shape input signal 42-1 by receiving the first input and the second input from the user, and may automatically generate the second base shape input signal 42-2 by receiving the fourth input and the fifth input.

The root shape generation portion 50 may generate a first root shape 51-1 by combining the first base shape 41-1 and the second base shape 41-2 input before the input of the first base shape input signal 42-1 that is input from or generated by the input portion 40, and may generate a second root shape 51-2 by combining the third base shape 41-3 and the fourth base shape 41-4 input before the input of the second base shape input signal 42-2. Next, the character processing portion 60, in response to an input complete signal, may generate a character by combining at least one of the root shapes 51-1 and 51-2 generated by the root shape generation portion 50 before the input of the input complete signal. In detail, the character processing portion 60 may receive at least one of the root shapes 51-1 and 51-2 generated by the root shape generation portion 50 and then the input complete signal input from the input portion 40. The character may be a character that the user finally desires to input. The character may include the simplified Chinese characters or the traditional Chinese characters.

A process of generating a character by the character processing portion 60 is described in detail with reference to FIG. 4.

Figure 4:
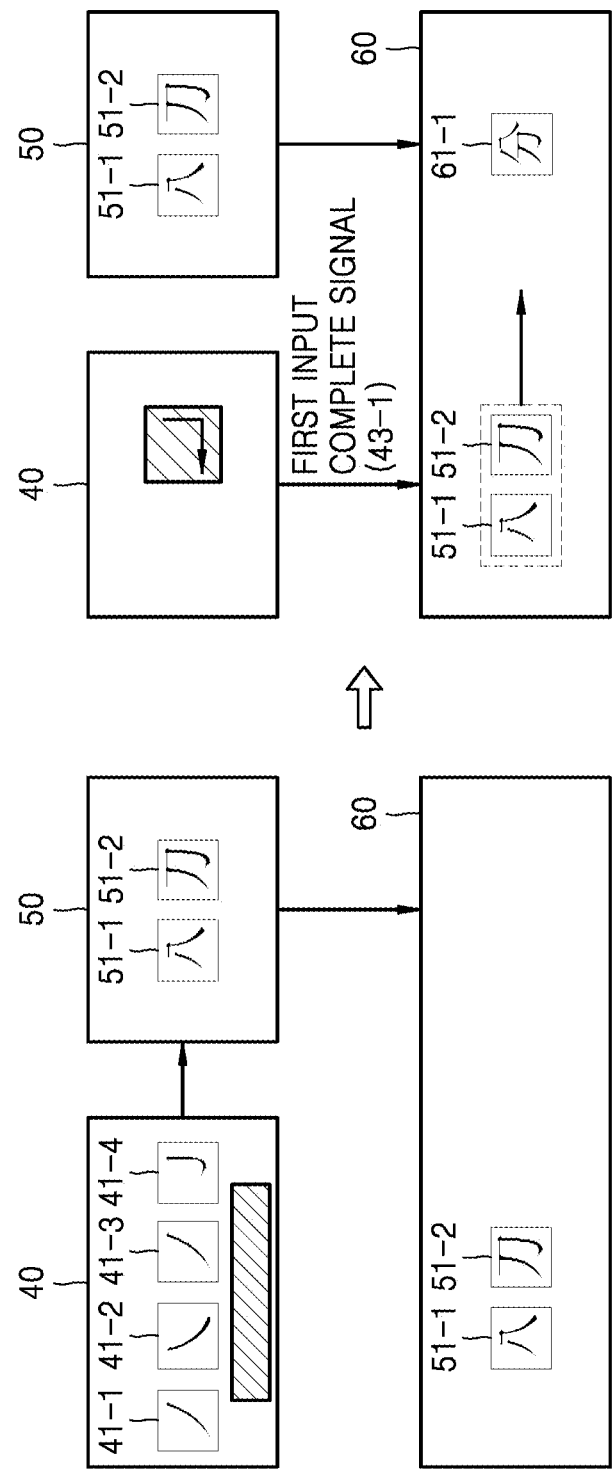
FIG. 4 illustrates an embodiment of an operation of a character processing portion that generates a character by combining the root shapes of FIG. 3.

FIG. 4 illustrates an embodiment of an operation of the character processing portion 60 that generates a character by combining the root shapes of FIG. 3.

Referring to FIGS. 3 and 4, the character processing portion 60 may receive inputs of the first root shape 51-1 and the second root shape 51-2 generated by the root shape generation portion 50. Next, the character processing portion 60 may receive an input of an input complete signal 43-1 from the input portion 40. In detail, as the user inputs a second specific button of any one of an enter button or a function button after inputting the base shapes 41-1 to 41-4 and the base shape input signals 42-1 and 42-2, the input portion 40 may input the input complete signal 43-1 corresponding to the second specific button input to the character processing portion 60.

In this state, the character processing portion 60 may generate a character 61-1 by combining the first root shape 51-1 and the second root shape 51-2 generated before the input of the input complete signal 43-1.

The character processing portion 60 may delete the root shape 51-1 or 51-2 or the base shape 41-1 to 41-4 forming the root shape 51-1 or 51-2 according to an input of a delete signal from the user before the input of the input complete signal 43-1.

Figure 5:
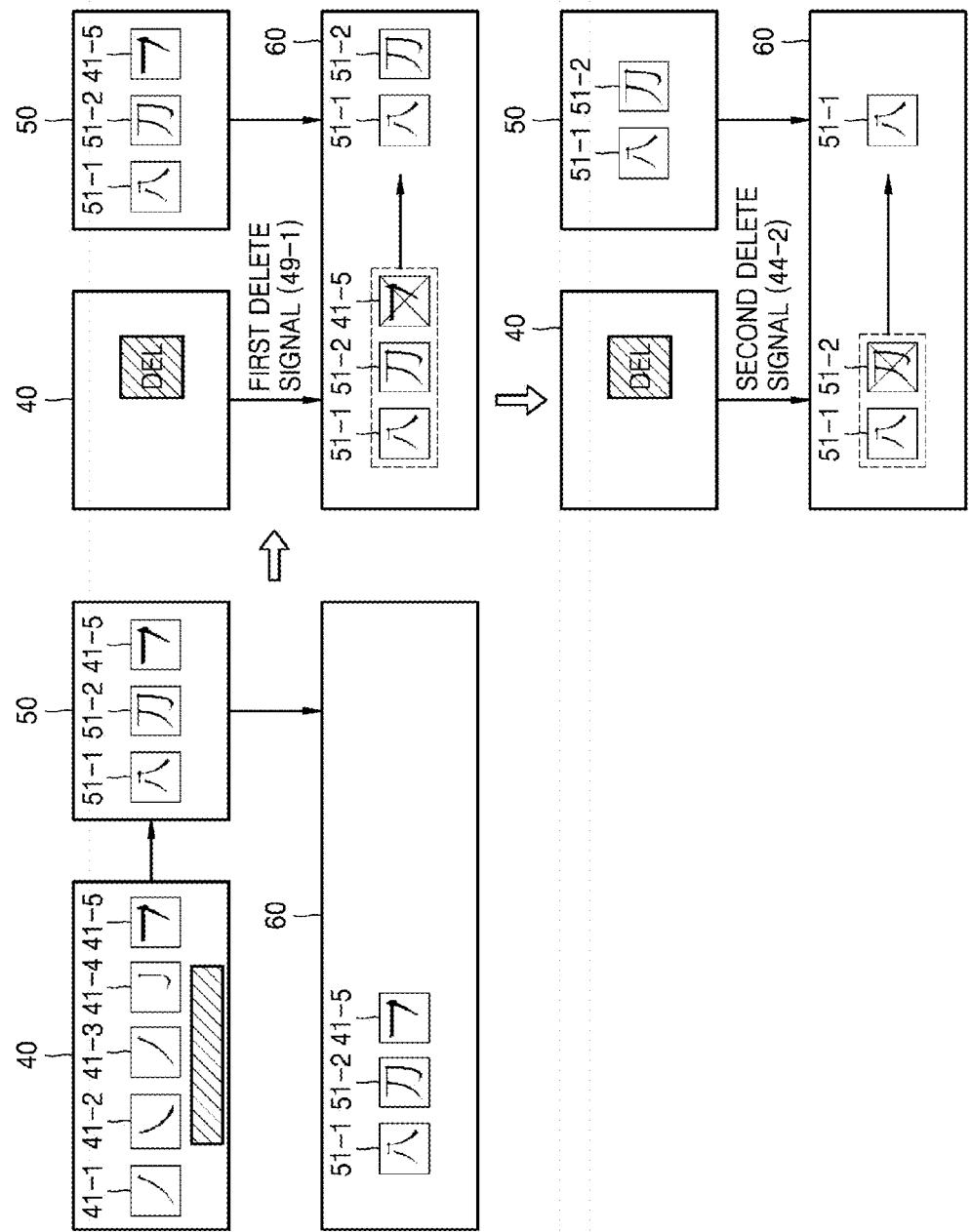
FIG. 5 illustrates an embodiment of a delete operation process of the character processing portion.

A deletion process of the character processing portion 60 in a process of inputting characters "分丁" by the user is described in detail in FIG. 5.

FIG. 5 illustrates an embodiment of a delete operation process by the character processing portion 60.

Referring to FIG. 5, the input portion 40 may receive input of the first base shape 41-1, the second base shape 41-2, the first base shape input signal 42-1, the third base shape 41-3, the fourth base shape 41-4, the second base shape input signal 42-2, and a fifth base shape 41-5, from the user. In this state, the root shape generation portion 50 may generate a root shape 51-1 and a root shape 51-2 respectively by combining the first base shape 41-1 and the second base shape 41-2, and the third base shape 41-3 and the fourth base shape 41-4, as illustrated in FIG. 3, or may keep the fifth base shape 41-5, as it is, as illustrated in FIG. 5. In other words, the character processing portion 60 may receive the root shape 51-1, the root shape 51-2, and the fifth base shape 41-5 from the root shape generation portion 50.

The input portion 40 may receive inputs of a first delete signal 49-1 and a second delete signal 44-2 corresponding to an input of a third specific button assigned to a DEL button or a function button, from the user, and may transfer the first delete signal 49-1 and the second delete signal 44-2 to the character processing portion 60. In other words, the character processing portion 60 may receive a first delete signal from the user before or after the input of an input complete signal, and may delete any one of the finally input base shape or root shape among the root shapes or base shapes generated by the root shape generation portion 50.

In detail, as illustrated in FIG. 5, the character processing portion 60 may receive an input of the first delete signal 49-1 from the user before the input of the input complete signal 43-1, and may delete the fifth base shape 41-5 that is finally input among the first root shape 51-1, the second root shape 51-2, and the fifth base shape 41-5. Furthermore, the character processing portion 60 may receive an input of the second delete signal 44-2, and may delete the root shape 51-2 that is finally input from the first root shape 51-1 and the second root shape 51-2.

Figure 6:
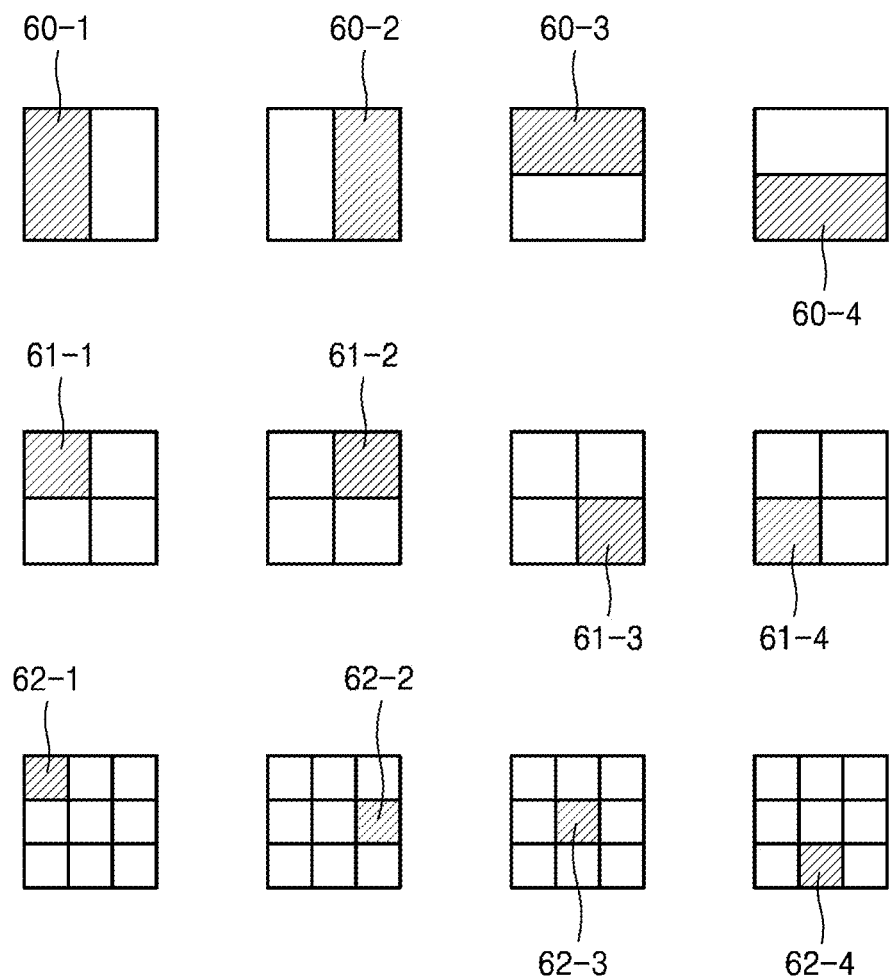
FIG. 6 illustrates an embodiment of assigning a position of a root shape when a character is generated by combining root shapes.

FIG. 6 illustrates an embodiment of assigning a position of a root shape when a character is generated by combining root shapes.

As described in the embodiment of FIG. 4, the character processing portion 60 may generate a character 61-1 by combining the first root shape 51-1 and the second root shape 51-2 generated by the root shape generation portion 50. In this state, the position of each root shape may vary according to the type of a character that the user desires to input. Accordingly, in order to accurately generate a character desired by the user, in the present embodiment, the user may designate the position of a root shape forming each character.

Accordingly, the input portion 40 may receive an input of a position designation signal to designate the position of a root shape, from the user. In this state, the user may input a position designation signal by using arrow buttons, numeric buttons, or previously set special buttons on a keyboard. For example, as the user inputs arrow buttons (←, →, ↑, ↓), a cursor may move over sections 60-1, 60-2, 60-3, and 60-4 indicating the position of a root shape, as illustrated in FIG. 6. Furthermore, as illustrated in FIG. 6, the cursor indicating the position of a root may move on four lattice section 61-1, 61-2, 61-3, and 61-4 or nine lattice sections 62-1, 62-2, 62-3, and 62-4, according to the user's input of a position designation signal. Although FIG. 6 illustrates an embodiment of four or nine lattice sections, in another embodiment of the present disclosure, the number of lattice sections may be variously set to, for example, two lattice sections or sixteen lattice sections. Furthermore, the section to set the position of a root shape is not necessarily set in the form of a lattice of FIG. 6, and may have various shapes and positions.

After designating the position of each root shape as in FIG. 6 through the input of a position designation signal, the user inputs an input complete signal by using an enter button, and thus the position of a root shape is finally determined. As such, when the position designation signal and the input complete signal for each root shape are all input through the input portion 40, the character processing portion 60 arrange each root shape at the position designated by the user, thereby generating a character desired by the user.

Figure 7:
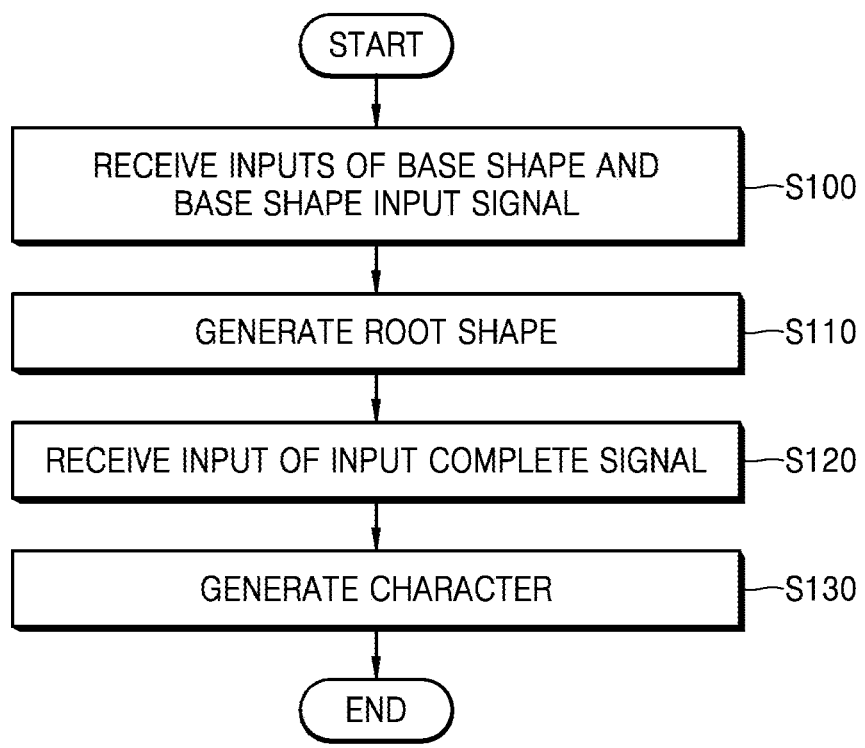
FIG. 7 is a flowchart for explaining an operation of a character input apparatus according to an embodiment of the present disclosure.

FIG. 7 is a flowchart for explaining an operation of a character input apparatus according to an embodiment of the present disclosure.

Referring to FIGS. 1 to 7, the input portion 40 receives inputs of at least one of the base shapes 41-1 to 41-5 and the base shape input signals 42-1 and 42-2 from a user (S100). In this state, the root shape generation portion 50 generates the root shape 51-1 by combining at least one of the base shapes 41-1 and 41-2 input before the input of the base shape input signal 42-1 according to the input of the base shape input signal 42-1 (S110). The input portion 40 receives an input of the input complete signal 43-1 from the user (S120). Next, the character processing portion 60 generates the character 61-1 by combing at least one of the root shapes 51-1 and 51-2 generated before the input complete signal 43-1 according to the input of the input complete signal 43-1 (S130).

Furthermore, in the present embodiment, the generating of a character (S130) may include receiving an input of a position designation signal with respect to at least one of the root shapes from the user, and generating a character by arranging at least one of the root shapes at a position designated by the position designation signal.

As described above, according to the embodiments of the present disclosure, the character input apparatus 100 may enable fast, easy, and direct input of the Chinese characters through intuitive input of a base shape without long-time learning, unlike the conventional Chinese character input methods, and may not only enable practicing and learning of the Chinese characters through the base shape input, but also enable a beginner to easily input the Chinese characters, by a method of inputting at least one base shape forming a root shape that is a radical of a Chinese character.

The present disclosure described above may be variously substituted, altered, and modified by those skilled in the art to which the present inventive concept pertains without departing from the scope and sprit of the present disclosure. Therefore, the present disclosure is not limited to the above-mentioned exemplary embodiments and the accompanying drawings.

The invention claimed is:

1. A character input method comprising:
   generating at least one root shape by a character input apparatus, comprising:
   receiving an input, by an input portion of the character input apparatus, of at least one base shape from a user;
   receiving an input by the input portion, of a base shape input signal from the user:
   generating, by a root shape generation circuit of the character input apparatus, a root shape by combining the at least one base shape input, wherein generating the root shape comprises combining the at least one base shape input in response to the input portion receiving a base shape input signal;

wherein each of step of receiving inputs of the at least one base shape, the step of receiving inputs of the base shape input signal, and the step of generating the root shape are performed at least once, thereby generating at least one root shape:

receiving, by the input portion, an input of an input complete signal from the user; and generating, by a character processing circuit of the character input apparatus, a character by combining the at least one root shape, wherein the input portion comprises a keyboard or a virtual keyboard.

2. The character input method of claim 1, wherein the base shape is any one of a plurality of base shapes in Table 1:

TABLE 1

| # | shape |
|---|---|
| 1 | z |
| 2 | z |
| 3 | ⟨ |
| 4 | — |
| 5 | ㅗ |
| 6 | — |
| 7 | ß |
| 8 | ╱ |
| 9 | ｉ |
| 10 | ｊ |
| 11 | ╯ |
| 12 | ┌ |
| 13 | ┐ |
| 14 | ㄴ |
| 15 | ㄴ |
| 16 | ㄴ |
| 17 | ╲ |
| 18 | ╱ |
| 19 | ╱ |
| 20 | ╮ |
| 21 | ┐ |
| 22 | ㄴ |
| 23 | ㄴ |
| 24 | ╲ |
| 25 | ┐ |
| 26 | ｜ |
| 27 | ｜ |
| 28 | ） |
| 29 | ＊ |
| 30 | ╲ |
| 31 | ┐ |
| 32 | ┐ |
| 33 | ― |
| 34 | ╲ |
| 35 | ㄴ |
| 36. | |

3. The character input method of claim 1, further comprising:

receiving an input of a delete signal from the user; and deleting the root shape or the base shape forming the character or the root shape, according to the input of the delete signal.

4. The character input method of claim 1, wherein the steps of receiving inputs of base shape, the step of receiving inputs base shape input signal and the step of generating root shape are each performed once, and wherein the character generated by the character processing circuit corresponds to one root shape.

5. The character input method of claim 1, wherein the character comprises simplified Chinese characters or traditional Chinese characters.

6. The character input method of claim 1, wherein the generating of the character comprises:

receiving an input of a position designation signal with respect to the at least one root shape from the user; and generating the character by arranging the at least one root shape at a position designated by the position designation signal.

7. A character input apparatus comprising:

an input portion configured to receive inputs of a base shape, a base shape input signal, and an input complete signal from a user, wherein the input portion comprises a keyboard or a virtual keyboard;

a root shape generation circuit configured to:

generate at least one root shape by combining at least one base shape received prior to receiving a base shape input signal by the input portion, wherein the root shape generation circuit is configured to combine the at least one base shape received by the input portion, and wherein the root shape generation circuit is configured to combine the at least one base shape in response to the input portion receiving the base shape input signal; and a character processing circuit configured to generate a character by combining at least one root shape generated by the root shape generation circuit prior to receiving an input complete signal by the input portion.

8. The character input apparatus of claim 7, wherein the base shape is any one of a plurality of base shapes in Table 1:

TABLE 1

| # | | # | | # | | # | | # | | # | |
|---|---|---|---|---|---|---|---|---|---|---|---|
| 1 | z | 7 | ß | 13 | ┐ | 19 | ╱ | 25 | ┐ | 31 | ┐ |
| 2 | z | 8 | ╱ | 14 | ㄴ | 20 | ╮ | 26 | ｜ | 32 | ┐ |
| 3 | ⟨ | 9 | ｉ | 15 | ㄴ | 21 | ┐ | 27 | ｜ | 33 | ― |
| 4 | — | 10 | ｊ | 16 | ㄴ | 22 | ㄴ | 28 | ） | 34 | ╲ |
| 5 | ㅗ | 11 | ╯ | 17 | ╲ | 23 | ㄴ | 29 | ＊ | 35 | ㄴ |
| 6 | — | 12 | ┌ | 18 | ╱ | 24 | ╲ | 30 | ╲ | 36. | |

9. The character input apparatus of claim 7, wherein the character processing circuit receives an input of a delete signal from the user before the input of the input complete signal, and delete the root shape or the base shape forming the character or the root shape, according to the input of the delete signal.

10. The character input apparatus of claim 7, wherein the character consists of one root shape, and wherein the character processing circuit generates the character from the one root shape generated by the root shape generation circuit.

11. The character input apparatus of claim 7, wherein the character comprises simplified Chinese characters or traditional Chinese characters.

12. The character input apparatus of claim 7, wherein the input portion receives an input of a position designation signal with respect to the at least one root shape from the user; and the character processing circuit generate the character by arranging the at least one root shape at a position designated by the position designation signal.

* * * * *